United States Patent
Chang et al.

(10) Patent No.: US 10,728,509 B2
(45) Date of Patent: Jul. 28, 2020

(54) PROJECTOR, OPTICAL ENGINE MODULE, IMAGE RESOLUTION ENHANCEMENT DEVICE AND DRIVING METHOD THEREOF

(71) Applicant: Coretronic Corporation, Hsin-Chu (TW)

(72) Inventors: Yi Chang, Hsin-Chu (TW); Wei-Hao Chen, Hsin-Chu (TW); Kuang-Yao Liu, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/115,578

(22) Filed: Aug. 29, 2018

(65) Prior Publication Data
US 2019/0166340 A1 May 30, 2019

(30) Foreign Application Priority Data
Nov. 30, 2017 (CN) .......................... 2017 1 1237499

(51) Int. Cl.
*H04N 9/31* (2006.01)
*G03B 21/14* (2006.01)
*G02B 27/09* (2006.01)
*G06T 3/40* (2006.01)
*G02B 26/08* (2006.01)
(Continued)

(52) U.S. Cl.
CPC .......... *H04N 9/3197* (2013.01); *G02B 7/1805* (2013.01); *G02B 26/0875* (2013.01); *G02B 27/0955* (2013.01); *G02B 27/1066* (2013.01); *G02B 27/126* (2013.01); *G03B 21/147* (2013.01); *G06T 3/4053* (2013.01)

(58) Field of Classification Search
CPC .... H04N 9/349; H04N 9/3197; H04N 5/2254; H04N 9/3194; H04N 9/3188; H04N 9/317; G06T 3/4053; G02B 27/646; G02B 7/1828; G03B 21/142; G03B 2205/0007
See application file for complete search history.

(56) References Cited

U.S. PATENT DOCUMENTS

2003/0076664 A1* 4/2003 Menschig ............ G02B 6/3636
361/772
2014/0009631 A1 1/2014 Topliss
(Continued)

FOREIGN PATENT DOCUMENTS

EP 0689349 12/1995
TW M327045 2/2008
(Continued)

OTHER PUBLICATIONS

"Search Report of Europe Counterpart Application", dated Feb. 22, 2019, p. 1-p. 8.

*Primary Examiner* — Isiaka O Akanbi
*Assistant Examiner* — Danell L Owens
(74) *Attorney, Agent, or Firm* — JCIPRNET

(57) ABSTRACT

A projector, an optical engine module, an image resolution enhancement device and a driving method are provided. The projector includes an illumination device, an optical engine module and a projection lens. The optical engine module is configured with the image resolution enhancement device configured to enhance a resolution of a projection light, and the image resolution enhancement device is adapted to enhance the image resolution by two times or four times.

22 Claims, 15 Drawing Sheets

(51) Int. Cl.
  *G02B 7/18*      (2006.01)
  *G02B 27/12*     (2006.01)
  *G02B 27/10*     (2006.01)

(56) References Cited

U.S. PATENT DOCUMENTS

2015/0264291 A1* 9/2015 Tani .................... H04N 5/7475
                                                348/748
2017/0299883 A1* 10/2017 Nonaka ................ G02B 27/646

FOREIGN PATENT DOCUMENTS

| TW | M539068    | 4/2017 |
|----|------------|--------|
| WO | 2016124253 | 8/2016 |
| WO | 2016124782 | 8/2016 |

* cited by examiner

PROJECTOR, OPTICAL ENGINE MODULE, IMAGE RESOLUTION ENHANCEMENT DEVICE AND DRIVING METHOD THEREOF

CROSS-REFERENCE TO RELATED APPLICATION

This application claims the priority benefit of China application serial no. 201711237499.8, filed on Nov. 30, 2017. The entirety of the above-mentioned patent application is hereby incorporated by reference herein and made a part of this specification.

BACKGROUND OF THE INVENTION

Field of the Invention

The invention relates to optoelectronic components of a projection device and a driving method thereof, and particularly relates to a projector, an optical engine module, an image resolution enhancement device and a driving method thereof.

Description of Related Art

Projection device is a display device used for producing large-scale images. An imaging principle of the projection device is to use a light valve to convert an illumination light produced by a light source into an image light, and then use a projection lens to project the image light on a screen or a wall. However, in the present products, a resolution of an image converted by the light valve has gradually failed to meet the demand of the market. In order to further enhance the image resolution, the light valve with a high resolution may be adopted in the projection device, though it may lead to a high cost of the projection device. Moreover, in some projection devices, a resolution enhancement element with an optical jitter technique may be additionally configured to further enhance the resolution of the image converted by the light valve. However, the commonly used resolution enhancement element may only provide an enhancement effect of two times.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a projector, an optical engine module, an image resolution enhancement device and a driving method thereof, which are adapted to improve a resolution of a projection light.

Other objects and advantages of the invention can be further illustrated by the technical features broadly embodied and described as follows.

In order to achieve one or a portion of or all of the objects or other objects, an embodiment of the invention provides a projector including an illumination device, an optical engine module and a projection lens. The illumination device is used for providing an illumination light. The optical engine module is disposed on a transmission path of the illumination light, and includes a light valve and an image resolution enhancement device. The light valve is used for converting the illumination light into an image light. The image resolution enhancement device is disposed on a transmission path of the image light, and includes a transparent plate and a carrier. The transparent plate is pervious to the image light and refracts the image light. The carrier carries the transparent plate, and includes a carrier board, a first frame, a second frame, at least one first vibration element and at least one second vibration element. The first frame has a first axis, the first axis is connected to the carrier board, and the first axis rotates according to a first driving electric signal. The second frame has a second axis, the second axis is connected to the first frame, the transparent plate is fixed in the second frame, and the second axis rotates according to a second driving electric signal. The at least one first vibration element is disposed on at least one side of the first frame, and makes the first frame to rotate relative to the carrier board through the first axis according to the first driving electric signal. The at least one second vibration element is disposed on at least one side of the second frame, and makes the second frame to rotate relative to the first frame through the second axis according to the second driving electric signal. According to rotation states of the first frame and the second frame, the image light is transmitted to a first position at a first time point in a frame cycle, and the image light is transmitted to a second position at a second time point in the frame cycle, wherein the first position and the second position are not overlapped. The projection lens is disposed on the transmission path of the image light coming from the image resolution enhancement device, wherein the image light becomes a projection light after passing through the projection lens.

In order to achieve one or a portion of or all of the objects or other objects, another embodiment of the invention provides an optical engine module including a light valve and an image resolution enhancement device. The light valve is used for providing an image light. The image resolution enhancement device is disposed on a transmission path of the image light, and includes a transparent plate and a carrier. The transparent plate is pervious to the image light and refracts the image light. The carrier carries the transparent plate, and includes a carrier board, a first frame, a second frame, at least one first vibration element and at least one second vibration element. The first frame has a first axis, the first axis is connected to the carrier board, and the first axis rotates according to a first driving electric signal. The second frame has a second axis, the second axis is connected to the first frame, the transparent plate is fixed in the second frame, and the second axis rotates according to a second driving electric signal. The at least one first vibration element is disposed on at least one side of the first frame, and makes the first frame to rotate relative to the carrier board through the first axis according to the first driving electric signal. The at least one second vibration element is disposed on at least one side of the second frame, and makes the second frame to rotate relative to the first frame through the second axis according to the second driving electric signal. According to rotation states of the first frame and the second frame, the image light is transmitted to a first position at a first time point in a frame cycle, and the image light is transmitted to a second position at a second time point in the frame cycle, wherein the first position and the second position are not overlapped.

In order to achieve one or a portion of or all of the objects or other objects, another embodiment of the invention provides an image resolution enhancement device including a transparent plate and a carrier. The transparent plate is pervious to an image light and refracts the image light. The transparent plate is fixed on the carrier. The carrier includes a carrier board, a first frame, a second frame, at least one first vibration element and at least one second vibration element. The first frame has a first axis, the first axis is connected to the carrier board, and the first axis rotates according to a first driving electric signal. The second frame has a second axis, the second axis is connected to the first frame, the transparent plate is fixed in the second frame, and the second axis rotates according to a second driving electric signal. The at least one first vibration element is disposed on at least one side of the first frame, and makes the first frame to rotate relative to the carrier board through the first axis according to the first driving electric signal. The at least one second vibration element is disposed on at least one side of the second frame, and makes the second frame to rotate relative to the first frame through the second axis according to the second driving electric signal. According to rotation states of the first frame and the second frame, the image light is transmitted to a first position at a first time point in a frame cycle, and the image light is transmitted to a second position at a second time point in the frame cycle, wherein the first position and the second position are not overlapped.

In order to achieve one or a portion of or all of the objects or other objects, another embodiment of the invention provides a driving method of an image resolution enhancement device. A first frame and a second frame are provided, wherein the first frame has a first axis, the second frame has a second axis, and the second axis is connected to the first frame. At least one first vibration element is provided, and the at least one first vibration element makes the first frame to rotate through the first axis according to a first driving electric signal. At least one second vibration element is provided, and the at least one second vibration element makes the second frame to rotate relative to the first frame through the second axis according to a second driving electric signal. According to rotation states of the first frame and the second frame, the image resolution enhancement device transmits the image beam to a first position at a first time point in a frame cycle, and the image resolution enhancement device transmits the image light to a second position at a second time point in the frame cycle, wherein the first position and the second position are not overlapped.

According to the above description, the embodiments of the invention have at least one of following advantages or effects: the first vibration element and the second vibration element in the image resolution enhancement device may respectively drive the first frame and the second frame of the image resolution enhancement device according to the first driving electric signal and the second driving electric signal, such that the first frame may rotate relative to the carrier board through the first axis, and the second frame may rotate relative to the first frame through the second axis, and the image beam may be refracted to two positions due to rotation of the transparent plate fixed to the second frame. Therefore, in one frame cycle, the image with twice of the resolution is synthesized by swiftly moving the positions of the image light, so as to greatly enhance the resolution of the projection light.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1:
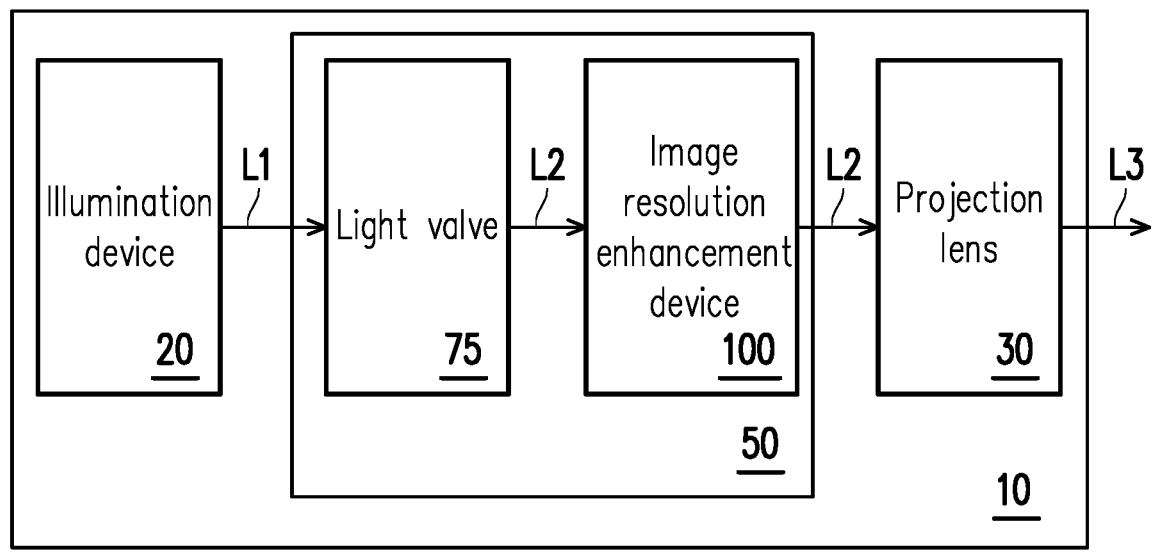
FIG. 1 is a block schematic diagram of a projector according to an embodiment of the invention.

FIG. 1 is a block schematic diagram of a projector according to an embodiment of the invention. Referring to FIG. 1, in the embodiment, the projector 10 includes an illumination device 20, an optical engine module 50 and a projection lens 30. The illumination device 20 is used for providing an illumination light L1. The optical engine module 50 is disposed on a transmission path of the illumination light L1, and is used for converting the illumination light L1 into an image light L2. To be specific, the optical engine module 50 includes a light valve 75 and an image resolution enhancement device 100. The light valve 75 is used for converting the illumination light L1 into the image light L2 to emit/provide the image beam L2. The image resolution enhancement device 100 is disposed on a transmission path of the image light L2 coming from the light valve 75. The projection lens 30 is disposed on the transmission path of the image light L2 coming from the image resolution enhancement device 100, wherein the image light L2 becomes a projection light L3 after passing through the projection lens 30. In the embodiment, the light valve 75 may be a digital micromirror device (DMD), a liquid crystal on silicon (LCoS) or a liquid crystal display (LCD) panel, which is not limited by the invention.

Figure 2:
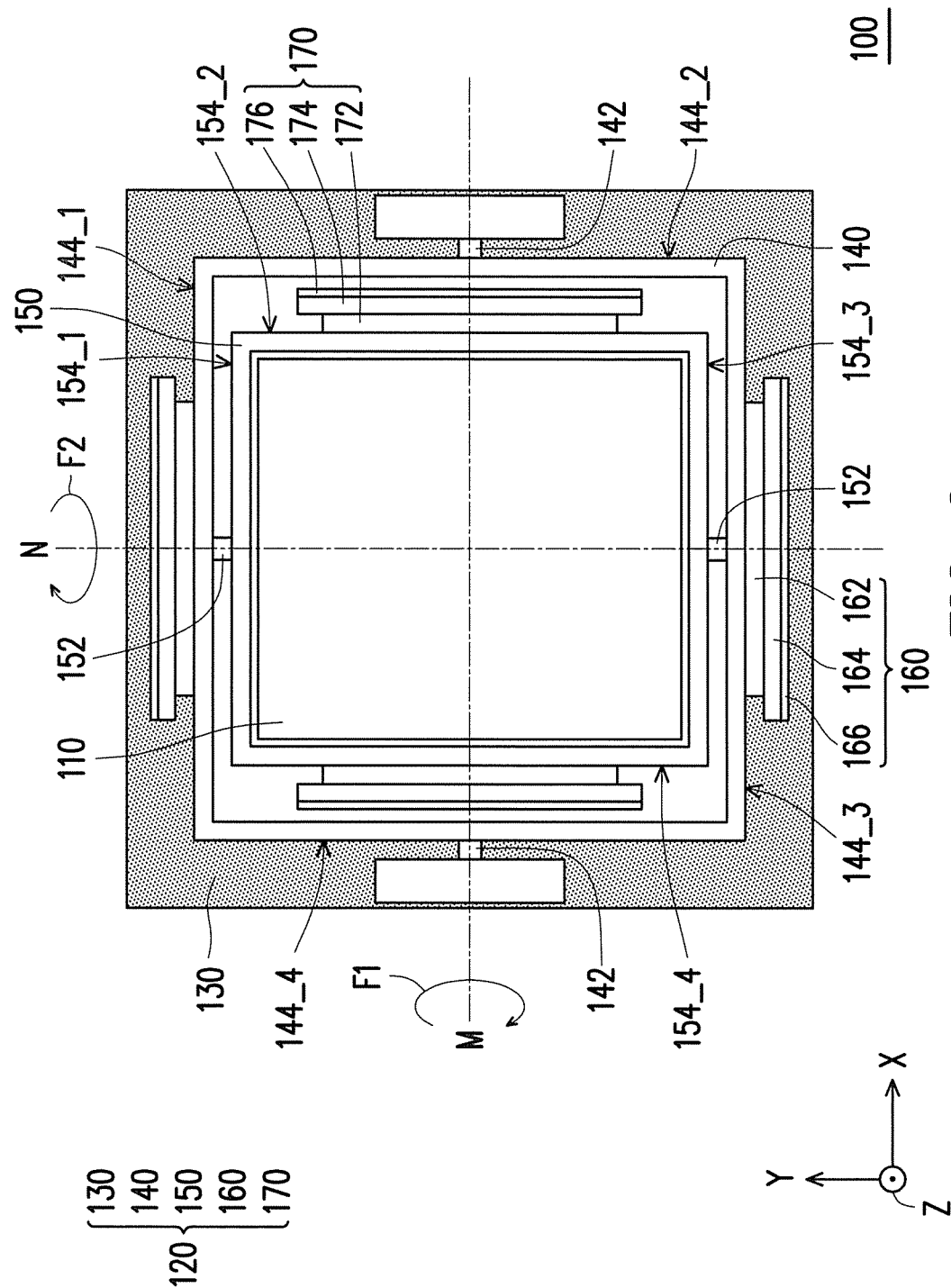
FIG. 2 is a schematic diagram of an image resolution enhancement device according to an embodiment of the invention.

FIG. 2 is a schematic diagram of the image resolution enhancement device according to an embodiment of the invention. Referring to FIG. 1 to FIG. 2, in detail, the image resolution enhancement device 100 includes a transparent plate 110 and a carrier 120. The carrier 120 carries the transparent plate 110, and the transparent plate 110 is fixed on the carrier 120. The carrier 120 includes a carrier board 130, a first frame 140, a second frame 150, at least one first vibration element 160 and at least one second vibration element 170. The first frame 140 has a first axis 142, and the first axis 142 is connected to the carrier board 130, in this way, the first frame 140 may rotate relative to the carrier board 130 through the first axis 142. The second frame 150 has a second axis 152, and the second axis 152 is connected to the first frame 140, in this way, the second frame 150 may rotate relative to the first frame 140 through the second axis 152. The transparent plate 110 is fixed in the second frame 150. The at least one first vibration element 160 is disposed on at least one side of the first frame 140. The at least one second vibration element 170 is disposed on at least one side of the second frame 150.

In the embodiment, the first frame 140, for example, has four sides 144_1, 144_2, 144_3, 144_4, and the second frame 150, for example, has four sides 154_1, 154_2, 154_3, 154_4. In the embodiment, the first axis 142 is, for example, disposed on the side 144_2 and the side 144_4, and an extending direction of the first axis 142 is, for example, defined as an X-axis direction (i.e. an axis M shown in FIG. 2); the second axis 152 is, for example, disposed on the side 154_1 and the side 154_3, and an extending direction of the second axis 152 is, for example, defined as a Y-axis direction (i.e. an axis N shown in FIG. 2), where the first axis 142 is orthogonal to the second axis 152. In brief, in the embodiment, an axial direction of the first axis 142 and an axial direction of the second axis 152 include an angle of 90 degrees. Though in other embodiments, the first axis 142 and the second axis 152 may be configured in a non-orthogonal and non-parallel manner, which is not limited by the invention.

The numbers of the first vibration elements 160 and the second vibration elements 170 are, for example, respectively two, and the first vibration elements 160 are disposed on the sides 144_1, 144_3 of the first frame 140, and the second vibration elements 170 are disposed on the sides 154_2, 154_4 of the second frame 150. Namely, in the embodiment, the two first vibration elements 160 are opposite to each other, and the two second vibration elements 170 are opposite to each other, though the invention is not limited thereto. In the embodiment, the first vibration elements 160 and the second vibration elements 170 may be voice coil motors (VCMs) or piezoelectric elements, which is not limited by the invention.

Figure 3:
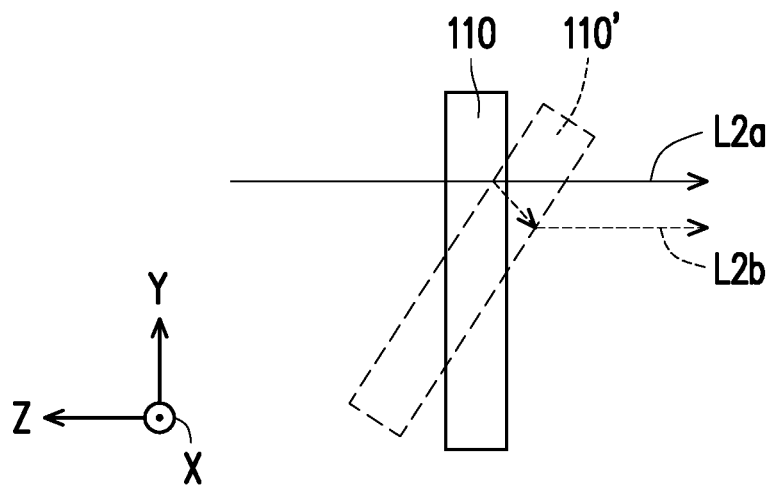
FIG. 3 is a side view of a transparent plate viewing from another viewing angle according to an embodiment of the invention.

FIG. 3 is a side view of the transparent plate viewing from another viewing angle according to an embodiment of the invention. As shown by solid lines of FIG. 3, in the embodiment, when the transparent plate 110 is not tilted, the transparent plate 110 is, for example, parallel to an XY plane, and the transparent plate 110 is pervious to an image light L2a. As shown by dotted lines of FIG. 3, in the embodiment, when the transparent plate 110' is not parallel to the XY plane (i.e. tilted relative to the XY plane), the transparent plate 110' is pervious to the image light L2a, and refracts the incident image light L2a, and an image light L2b is emitted from the transparent plate 110'.

Figure 4:
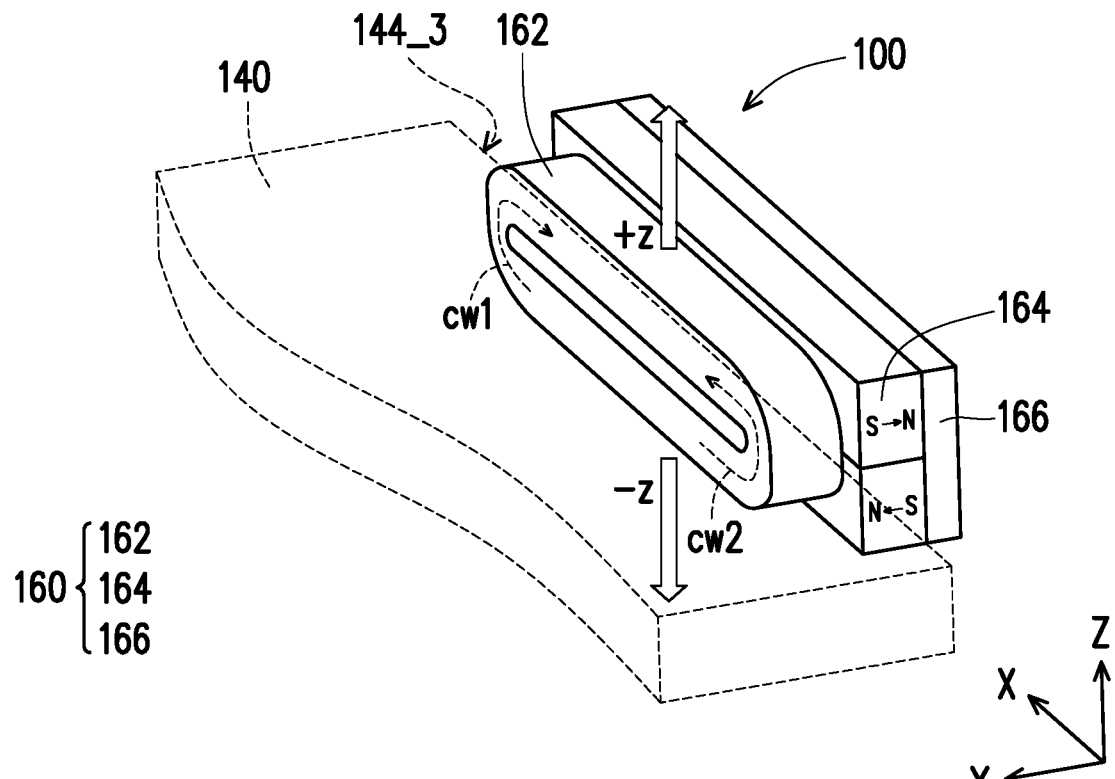
FIG. 4 is a three-dimensional view of a part of the image resolution enhancement device of FIG. 2.

FIG. 4 is a three-dimensional view of a part of the image resolution enhancement device of FIG. 2. Referring to FIG. 2 to FIG. 4, in detail, each of the first vibration elements 160 includes a first coil 162 and a first magnet 164. The first coil 162 is, for example, disposed on at least one side 144_1 or 1443 of the first frame 140. The first magnet 164 is disposed on at least one side of the carrier board 130, where the first coil 162 faces the first magnet 164, and the first coil 162 is disposed between the first frame 140 and the first magnet 164, though the invention is not limited thereto. In other embodiments that are not illustrated, the first coil 162 may also be selectively disposed on at least one side of the carrier board 130, and the first magnet 164 may be selectively disposed on at least one side of the first frame 140, though the invention is not limited thereto. Moreover, in the embodiment, each of the second vibration elements 170 includes a second coil 172 and a second magnet 174. The second coil 172 is, for example, disposed on at least one side 154_2 or 154_4 of the second frame 150. The second magnet 174 is disposed on at least one side 144_2 or 144_4 of the first frame 140, where the second coil 172 faces the second magnet 174, and the second coil 172 is disposed between the second frame 150 and the second magnet 174, though the invention is not limited thereto. In other embodiments, the second coil 172 may also be selectively disposed on at least one side of the first frame 140, and the second magnet 174 may be selectively disposed on at least one side of the second frame 150. The first magnet 164 and the second magnet 174 are, for example, permanent magnets, though the invention is not limited thereto. In other embodiments, the first magnet 164 and the second magnet 174 may also be electromagnets, though the invention is not limited thereto.

In the embodiment, the first vibration element 160 further includes a first yoke 166, where the first magnet 164 is located between the first coil 162 and the first yoke 166. In the embodiment, the second vibration element 170 further includes a second yoke 176, where the second magnet 174 is located between the second coil 172 and the second yoke 176. To be specific, the first yoke 166 and the second yoke 176 are, for example, magnetic metal, and the first magnet 164 and the second magnet 174 may be respectively attracted to the first yoke 166 and the second yoke 176. Configuration of the first yoke 166 and the second yoke 176 may improve an electromagnetic shielding effect of the first vibration element 160 and the second vibration element 170.

Figure 5A:
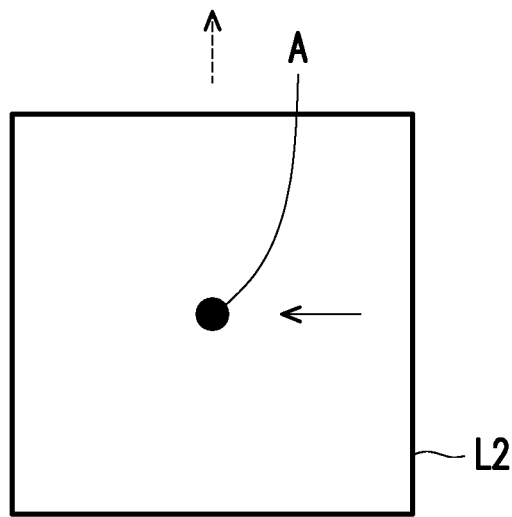
FIG. 5A to FIG. 5D are schematic diagrams of moving paths of an image light when the image resolution enhancement device is driven.

FIG. 5A to FIG. 5D are schematic diagrams of moving paths of the image light when the image resolution enhancement device is driven. FIG. 6A and FIG. 6B are schematic diagrams of positions of the first frame and the second frame of FIG. 2 when the image resolution enhancement device is driven, where a horizontal axis represents time, and a vertical axis of FIG. 6A represents a position of the first frame, and the vertical axis of FIG. 6B represents a position of the second frame. Referring to FIG. 2, FIG. 5A and FIGS. 6A-6B, at a first time point T0 of a frame cycle, the transparent plate 110 of the image resolution enhancement device 100 may transmit (refract) the image light L2 to a first position A according to rotation states of the first frame 140 and the second frame 150, where the first frame 140 is, for example, rotated to a position F1-1, and the second frame 150 is, for example, rotated to a position F2-1. In the embodiment, the image light L2 is, for example, transmitted to the first position A from an initial position (not shown) located on the right of FIG. 5A, though the invention is not limited thereto.

Figure 5B:
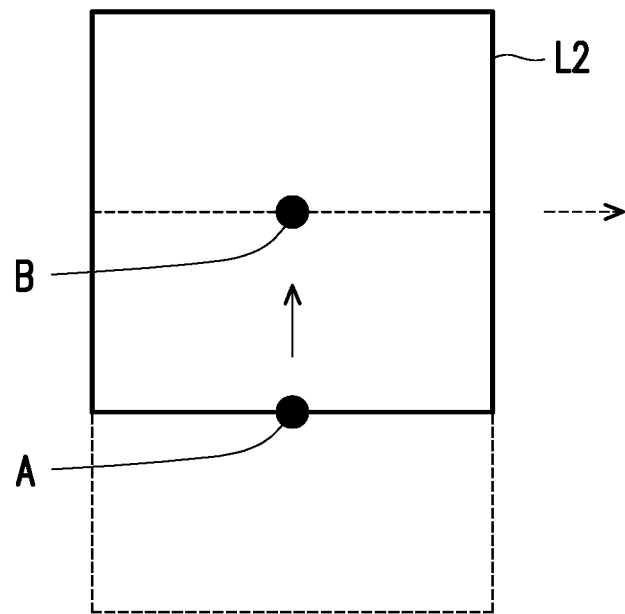
Figure 6A:
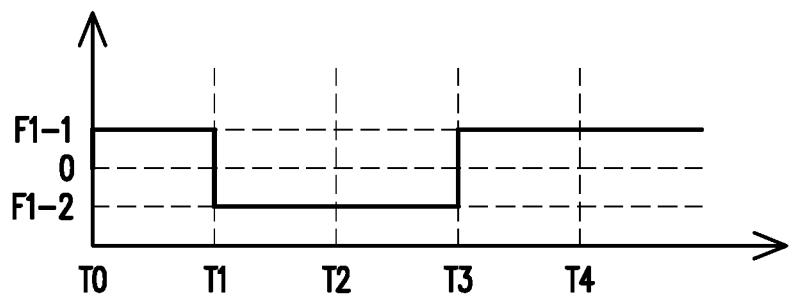
FIG. 6A and FIG. 6B are schematic diagrams of positions of a first frame and a second frame of FIG. 2 when the image resolution enhancement device is driven.
Figure 6B:
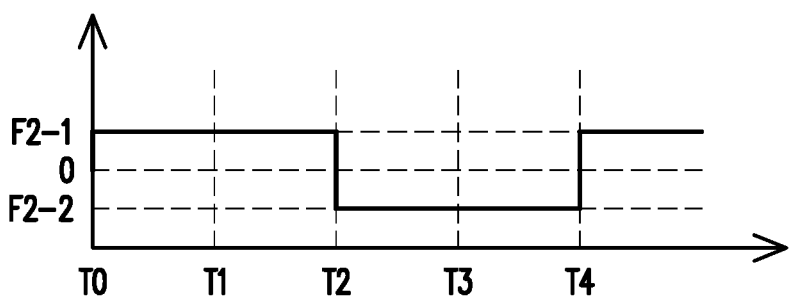

Similarly, referring to FIG. 2, FIG. 5B and FIGS. 6A-6B, at a second time point T1 of the frame cycle, the transparent plate 110 of the image resolution enhancement device 100 may transmit (refract) the image light L2 to a second position B according to the rotation states of the first frame 140 and the second frame 150, where the first frame 140 is, for example, rotated to a position F1-2, and the second frame 150 is, for example, rotated to the position F2-1. In the embodiment, as shown in FIG. 5B, the image light L2 is, for example, transmitted from the lower first position A to the upper second position B, and the second position B is, for example, located right above the first position A, though the invention is not limited thereto.

Figure 5C:
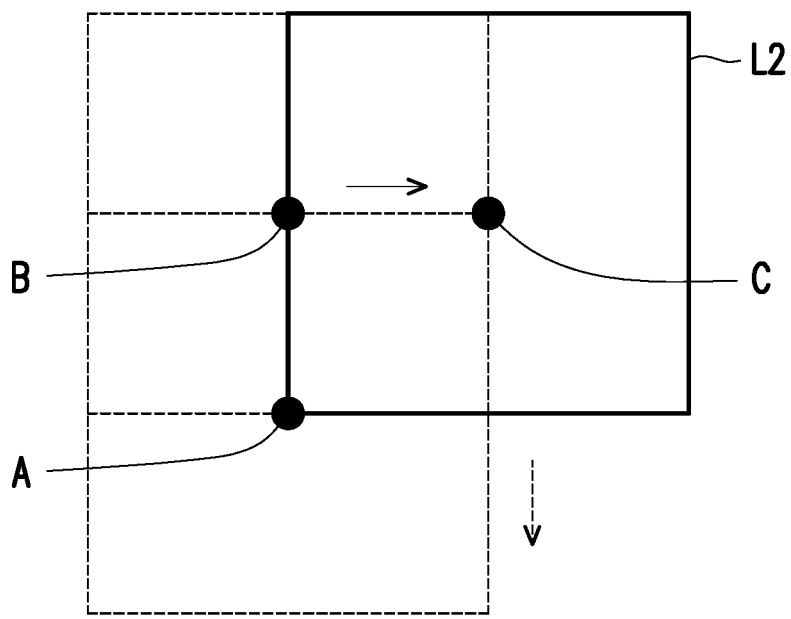

Similarly, referring to FIG. 2, FIG. 5C and FIGS. 6A-6B, at a third time point T2 of the frame cycle, the transparent plate 110 of the image resolution enhancement device 100 may transmit (refract) the image light L2 to a third position C according to the rotation states of the first frame 140 and the second frame 150, where the first frame 140 is, for example, rotated to the position F1-2, and the second frame 150 is, for example, rotated to a position F2-2. In the embodiment, as shown in FIG. 5C, the image light L2 is, for example, transmitted from the second position B on the left to the third position C on the right, and the third position C is, for example, located right to the right of the second position B, though the invention is not limited thereto.

Figure 5D:
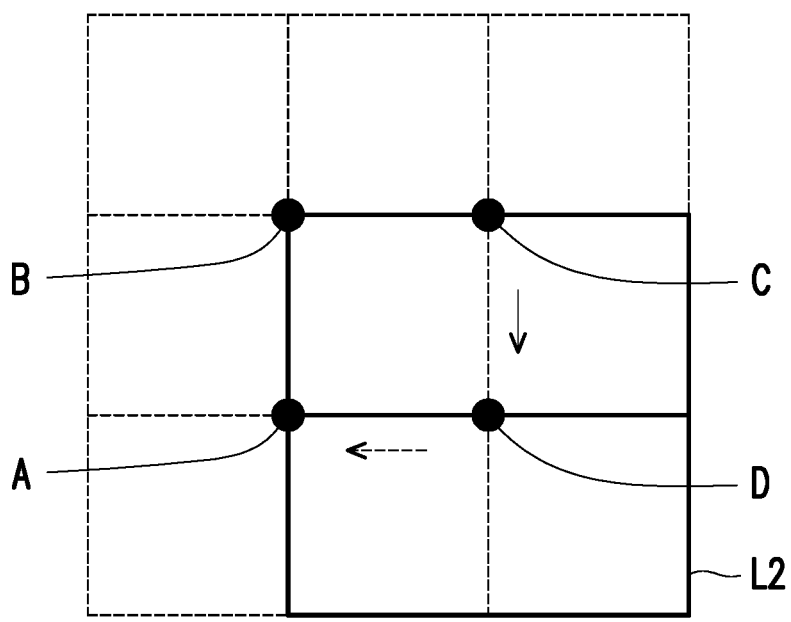

Similarly, referring to FIG. 2, FIG. 5D and FIGS. 6A-6B, at a fourth time point T3 of the frame cycle, the transparent plate 110 of the image resolution enhancement device 100 may transmit (refract) the image light L2 to a fourth position D according to the rotation states of the first frame 140 and the second frame 150, where the first frame 140 is, for example, rotated to the position F1-1, and the second frame 150 is, for example, rotated to the position F2-2. In the embodiment, as shown in FIG. 5D, the image light L2 is, for example, transmitted from the upper third position C to the lower fourth position D, and the fourth position D is, for example, located right below the third position C, though the invention is not limited thereto. Similarly, at a first time point of a next frame cycle, the image light L2 may be again transmitted (refracted) to the first position A, and the positions of the image light L2 and the first frame 140/the second frame 150 may be deduced by analogy, and detail thereof is not repeated. According to the above embodiment, it is known that the path constructed by the first position A, the second position B, the third position C and the fourth position D is, for example, a square, though the invention is not limited thereto. In other embodiments, the path constructed by the four positions may also be a rectangle, which is not limited by the invention.

According to the above description, it is known that in one frame cycle, the image light L2 may be transmitted to four positions. Therefore, though the operation of the image resolution enhancement device 100, a resolution of the projection light L3 projected by the projection lens 30 is enhanced by four times. Moreover, by using the first vibration elements 160 and the second vibration elements 170, the first frame 140 and the second frame 150 may be rotated in a balanced and smooth way.

Figure 7:
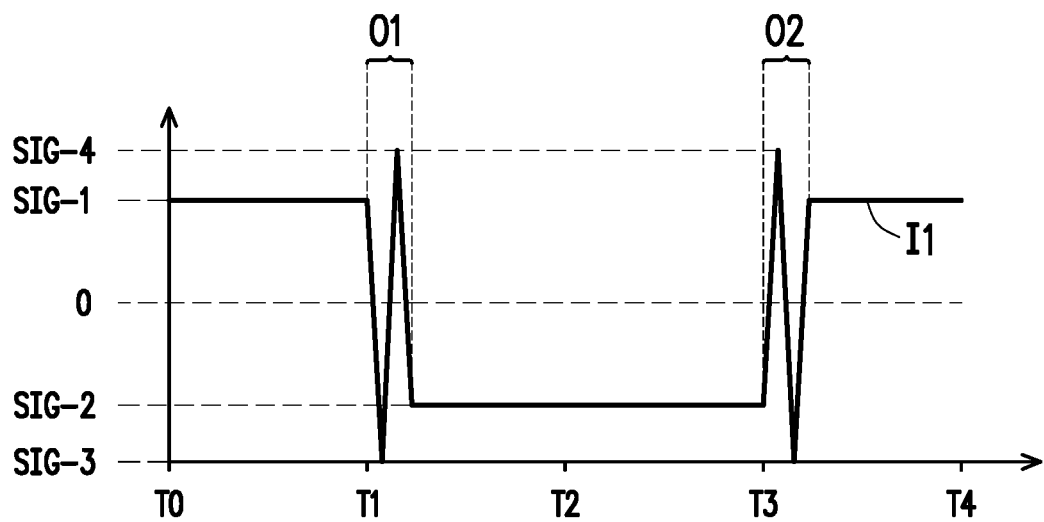
FIG. 7 and FIG. 8 are driving electric signals according to an embodiment of the invention.
Figure 8:
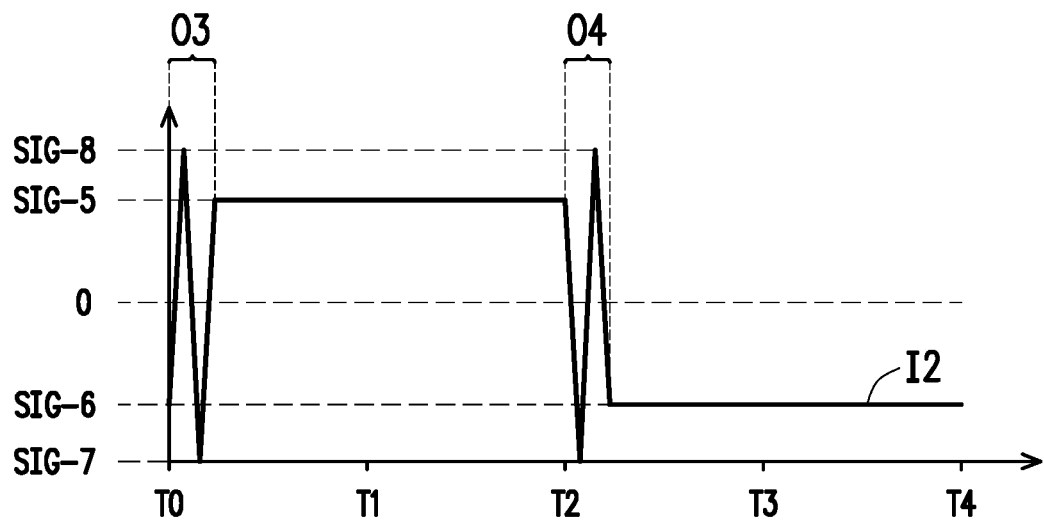

FIG. 7 and FIG. 8 are driving electric signals according to an embodiment of the invention. In detail, as shown in FIG. 2, FIG. 4, FIG. 7 and FIG. 8, in the embodiment, a first driving electric signal I1 is provided to the first vibration elements 160, and a second driving electric signal I2 is provided to the second vibration elements 170. In the embodiment, the first driving electric signal I1 may drive all of the first vibration elements 160, and the second driving electric signal I2 may drive all of the second vibration elements 170. In detail, in the embodiment, the first driving electric signal I1 is transmitted to the first coil 162, where a clockwise direction cw1 or an anticlockwise direction cw2 of the current in the first coil 162 is, for example, determined by a polarity (positive polarity or negative polarity) of the first driving electric signal I1, though the invention is not limited thereto. In the embodiment, the first coil 162 is controlled by an interaction between a direction of the current in the first coil 162 and a magnetic field in the first magnet 164 to move, and drives the first frame 140 to move, so that the first frame 140 may rotate/swing relative to the carrier board 130 towards a first direction F1 or an opposite direction of the first direction F1 through the first axis 142. Similarly, the second driving electric signal I2 is provided to the second coil 172 of the second vibration element 170, and the second coil 172 is controlled by an interaction between a direction of the current (which is determined by the polarity of the second driving electric signal I2) in the first coil 172 and a magnetic field in the first magnet 174 to move, and drives the second frame 150 to move, so that the second frame 150 may rotate/swing relative to the first frame 140 towards a second direction F2 or an opposite direction of the second direction F2 through the second axis 152. In the embodiment, the first driving electric signal I1 and the second driving electric signal I2 are, for example, all current signals, the first driving electric signal I1/the second driving electric signal I2 of the positive polarity, for example, has a positive current value, and the first driving electric signal I1/the second driving electric signal I2 of the negative polarity, for example, has a negative current value, though the invention is not limited thereto. As shown in FIG. 4, in the embodiment, when the current in the first coil 162 flows in the clockwise direction cw1, the first coil 162 may move towards a +Z direction to drive the first frame 140 to move, so that the first frame 140 may rotate/swing relative to the carrier board 130 through the first axis 142. Similarly, in the embodiment, when the current in the first coil 162 flows in the anticlockwise direction cw2, the first coil 162 may move towards a −Z direction to drive the first frame 140 to move, so that the first frame 140 may rotate/swing relative to the carrier board 130 through the first axis 142.

Referring to FIG. 7 and FIG. 8, in the embodiment, the first driving electric signal I1 and the second driving electric signal I2, for example, have a same waveform, but have a phase difference of 90 degrees, though the invention is not limited thereto. In detail, as shown in FIG. 7, the first driving electric signal I1 is, for example, transited between a first level SIG-1 and a second level SIG-2, and a first overdrive electric signal O1 is, for example, loaded on the first driving electric signal I1 during a rotation time interval, and a first overdrive electric signal O2 is, for example, loaded on the first driving electric signal I1 during another rotation time interval, where the first overdrive electric signal O1/O2 is transited between a third level SIG-3 and a fourth level SIG-4, and an absolute value of a difference between the third level SIG-3 and the fourth level SIG-4 is greater than an absolute value of a difference between the first level SIG-1 and the second level SIG-2.

Similarly, as shown in FIG. 8, the second driving electric signal 12 is, for example, transited between a first level SIG-5 and a second level SIG-6, and a second overdrive electric signal O3 is, for example, loaded on the second driving electric signal 12 during still another rotation time interval, and a second overdrive electric signal O4 is, for example, loaded on the second driving electric signal 12 during yet another rotation time interval, where the second overdrive electric signal O3/O4 is transited between a third level SIG-7 and a fourth level SIG-8, and an absolute value of a difference between the third level SIG-7 and the fourth level SIG-8 is greater than an absolute value of a difference between the first level SIG-5 and the second level SIG-6. In the embodiment, a value of the first level SIG-1 is the same to a value of the first level SIG-5, a value of the second level SIG-2 is the same to a value of the second level SIG-6, a value of the third level SIG-3 is the same to a value of the third level SIG-7, and a value of the fourth level SIG-4 is the same to a value of the fourth level SIG-8, though the invention is not limited thereto. In other embodiments, the value of the first level SIG-1 may be different to the value of the first level SIG-5, the value of the second level SIG-2 may be different to the value of the second level SIG-6, the value of the third level SIG-3 may be different to the value of the third level SIG-7, and the value of the fourth level SIG-4 may be different to the value of the fourth level SIG-8, though the invention is still not limited thereto. In the embodiment, through the first overdrive electric signals O1, O2 and the second overdrive electric signals O3, O4 fluctuated instantaneously between the third level SIG-3/SIG-7 and the fourth level SIG-4/SIG-8 in a short time, the first frame 140/the second frame 150 may be accurately rotated in the short time and fixed to a predetermined position after getting balanced, so that the image light L2 may accurately reach a predetermined position.

As shown in FIG. 2, FIG. 5A and FIG. 8, in the embodiment, during a time interval from the first time point T0 to the second time point T1, the second driving electric signal 12, for example, drives the second frame 150 to rotate along the second direction F2 or an opposite direction of the second direction F2, such that the transparent plate 110 may refract the image light L2 from the initial position (not shown) to the first position A as the second frame 150 rotates along the second direction F2 or the opposite direction of the second direction F2. In the embodiment, during the time interval from the first time point T0 to the second time point T1, the second overdrive electric signal O2 loaded to the second driving electric signal 12 makes the second frame 150 to accurately rotate in a short time, such that the image light L2 may accurately reach the first position A.

Then, as shown in FIG. 2, FIG. 5B and FIG. 7, during a time interval from the second time point T1 to the third time point T2, the first driving electric signal I1 is transited from the first level SIG-1 to the second level SIG-2, and the first frame 140 may rotate along the first direction F1 or an opposite direction of the first direction F1 through the first axis 142, such that the transparent plate 110 rotates along the first direction F1 or the opposite direction of the first direction F1 due to the rotation of the first frame 140 to move the image light L2 from the first position A to the second position B. In the embodiment, during the time interval from the second time point T1 to the third time point T2, the first overdrive electric signal O1 loaded to the first driving electric signal I1 makes the first frame 140 to accurately rotate in a short time, such that the image light L2 may accurately reach the second position B.

Then, as shown in FIG. 2, FIG. 5C and FIG. 8, during a time interval from the third time point T2 to the fourth time point T3, the second driving electric signal 12 is transited from the first level SIG-5 to the second level SIG-6, and the second frame 150 may rotate along the second direction F2 or the opposite direction of the second direction F2 through the second axis 152, such that the transparent plate 110 rotates along the second direction F2 or the opposite direction of the second direction F2 due to the rotation of the second frame 150 to move the image light L2 from the second position B to the third position C. In the embodiment, during the time interval from the third time point T2 to the fourth time point T3, the second overdrive electric signal O4 loaded to the second driving electric signal 12 makes the second frame 150 to accurately rotate in a short time, such that the image light L2 may accurately reach the third position C.

Then, as shown in FIG. 2, FIG. 5D and FIG. 7, during a time interval from the fourth time point T3 to a first time point T4 of a next frame cycle, the first driving electric signal I1 is transited from the second level SIG-2 to the first level SIG-1, and the first frame 140 may rotate along the first direction F1 or the opposite direction of the first direction F1 through the first axis 142, such that the transparent plate 110 rotates along the first direction F1 or the opposite direction of the first direction F1 due to the rotation of the first frame 140 to move the image light L2 from the third position C to the fourth position D. In the embodiment, during the time interval from the fourth time point T3 to the first time point T4 of the next frame cycle, the first overdrive electric signal O2 loaded to the first driving electric signal I1 makes the first frame 140 to accurately rotate in a short time, such that the image light L2 may accurately reach the fourth position D.

According to the above description, it is known that from the first time point T0 to the first time point T4 of the next frame cycle, the image light L2 is moved in a sequence of the positions A, B, C, D from the initial position to complete a frame cycle, and the image with a four times resolution is synthesized by rapidly moving the positions, so as to greatly improve the resolution of the projection light.

Figure 9:
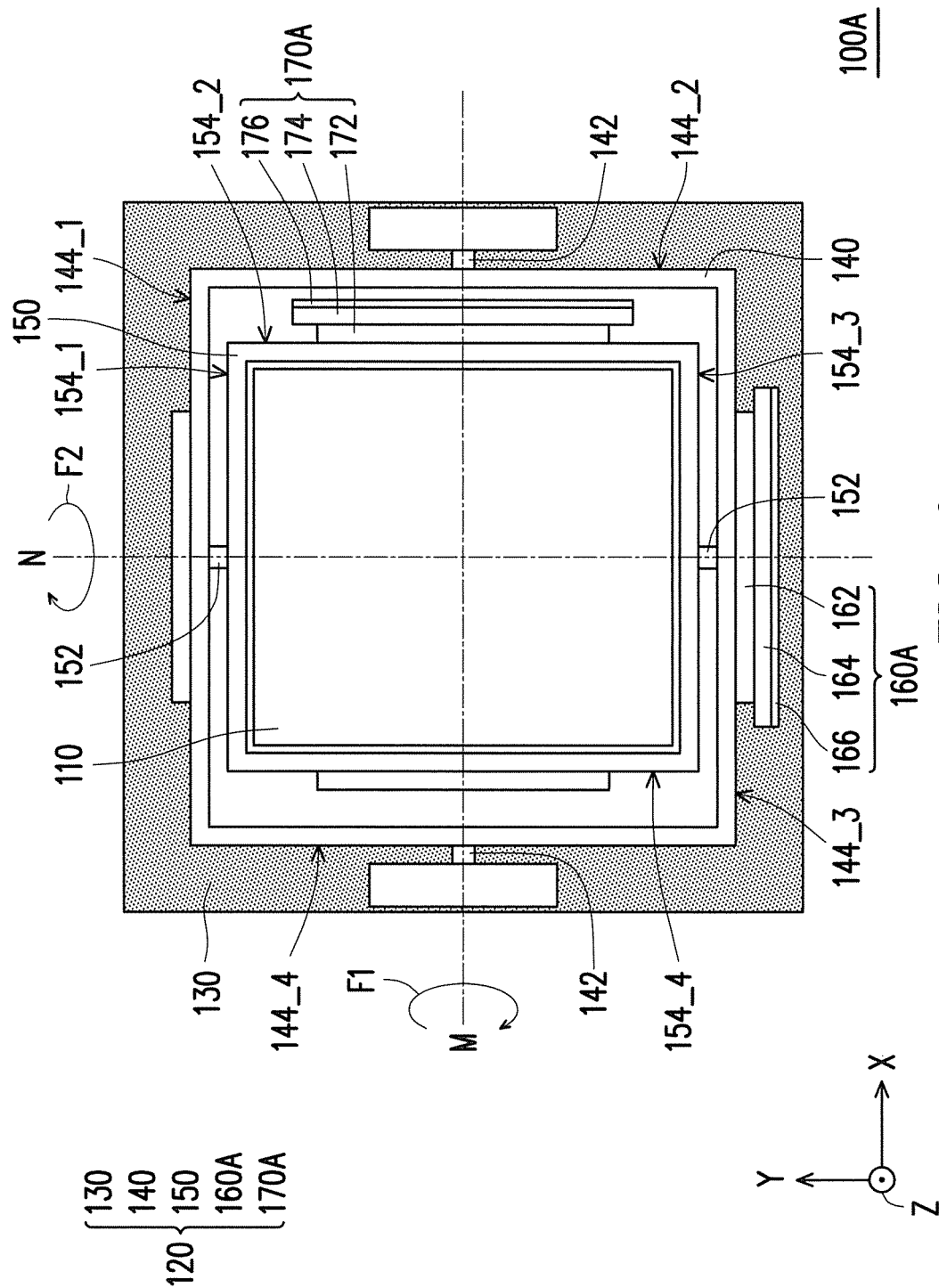
FIG. 9 is a schematic diagram of an image resolution enhancement device according to another embodiment of the invention.

FIG. 9 is a schematic diagram of an image resolution enhancement device according to another embodiment of the invention. Referring to FIG. 9, the image resolution enhancement device 100A of the embodiment is similar to the image resolution enhancement device 100 of FIG. 2, and a main difference there between is that in the embodiment, the number of the first vibration element 160A and the number of the second vibration element 170A of the image resolution enhancement device 100A are respectively one, and the first vibration element 160A and the second vibration element 170A are respectively disposed at one side of the first frame 140 and the second frame 150. In the embodiment, only one first vibration element 160A and one second vibration element 170A are applied to achieve the effect of rotating the first frame 140 and the second frame 150, such that a device usage amount is saved. In other embodiments that are not illustrated, the numbers of the first axis 142 and the second axis 152 are also respectively one, which may still achieve the effect of rotating the first frame 140 and the second frame 150, and an effect of a simplified design is achieved.

Figure 10:
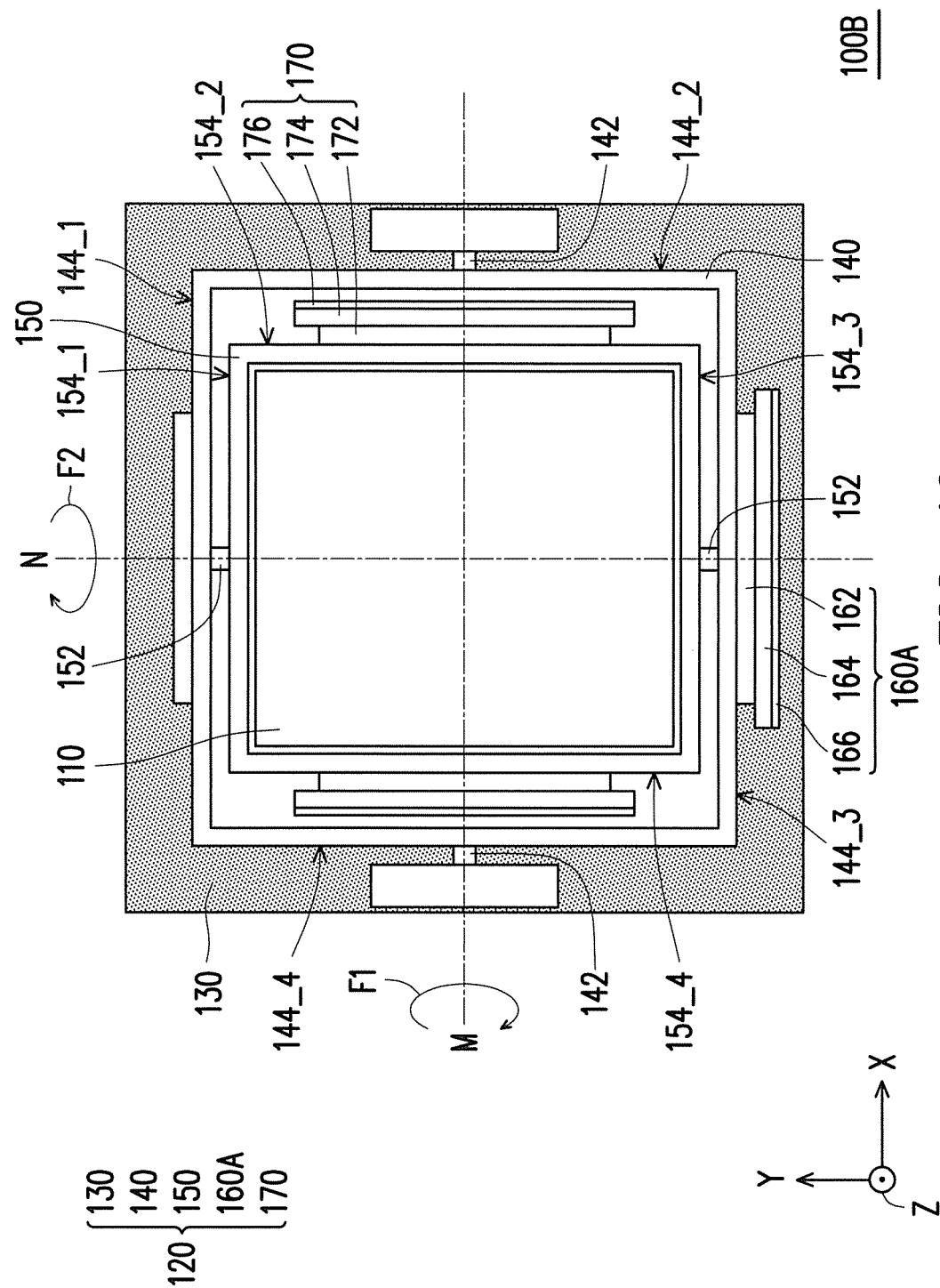
FIG. 10 is a schematic diagram of an image resolution enhancement device according to another embodiment of the invention.

FIG. 10 is a schematic diagram of an image resolution enhancement device according to another embodiment of the invention. Referring to FIG. 10, the image resolution enhancement device 100B of the embodiment is similar to the image resolution enhancement device 100 of FIG. 2, and a main difference therebetween is that in the image resolution enhancement device 100B of the embodiment, the number of the first vibration element 160A is one, and the single first vibration element 160A is used in collaboration with two second vibration elements 170, where the single first vibration element 160A is located between the two second vibration elements 170, and the two second vibration elements 170 are opposite to each other. In other embodiments that are not illustrated, two first vibration elements may be selectively used in collaboration with a single second vibration element, which is not limited by the invention.

Figure 11:
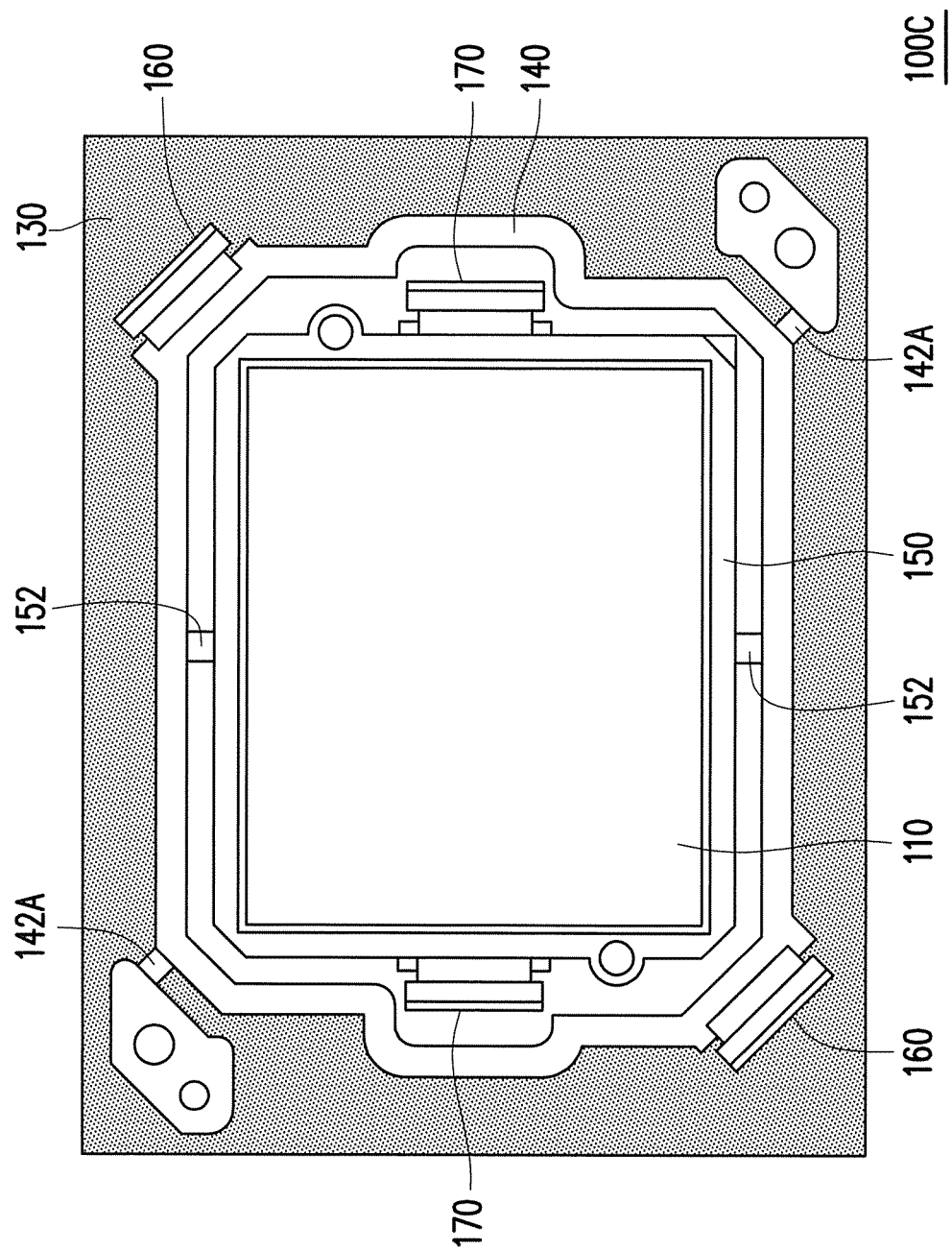
FIG. 11 is a schematic diagram of an image resolution enhancement device according to another embodiment of the invention.
Figure 12:
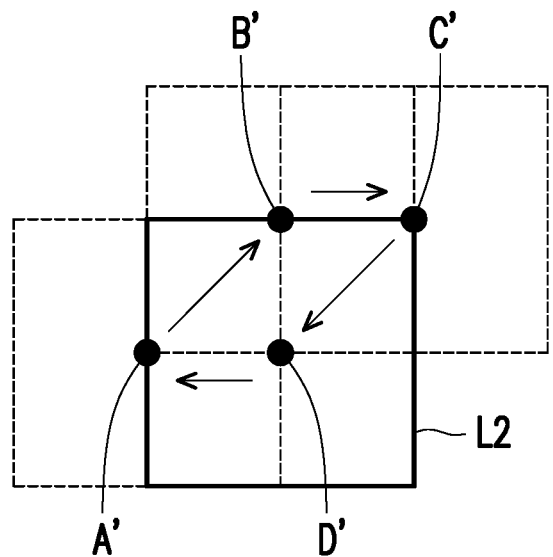
FIG. 12 is a schematic diagram of an image moving path of the image resolution enhancement device of FIG. 11.

FIG. 11 is a schematic diagram of an image resolution enhancement device according to another embodiment of the invention. FIG. 12 is a schematic diagram of an image moving path of the image resolution enhancement device of FIG. 11. Referring to FIG. 11 and FIG. 12, the image resolution enhancement device 100C of the embodiment is similar to the image resolution enhancement device 100 of FIG. 2, and a main difference therebetween is that in the embodiment, the first axis 142A and the second axis 152 are neither orthogonal nor parallel to each other. For example, in the embodiment, the first axis 142A is, for example, located on a diagonal of the first frame 140. Therefore, when the image resolution enhancement device 100C is driven, the first frame 140 takes the first axis 142A located on the diagonal as a rotation shaft to rotate, so as to drive the transparent plate 110 to move/rotate.

In this way, the transparent plate 110 may simultaneously rotate along the second axis 152 that is not located on the diagonal and the first axis 142A located on the diagonal to sequentially refract the image light L2 to the first position A', the second position B', the third position C' and the fourth position D'. As shown in FIG. 12, the path constructed by the first position A', the second position B', the third position C' and the fourth position D' is, for example, a parallelogram, though the invention is not limited thereto. In other embodiments, the path constructed by the first position, the second position, the third position and the fourth position may also be a rhombus or other suitable quadrangles, which is not limited by the invention, and enough instructions and recommendations for detailed steps and implementation thereof may be learned from the aforementioned driving method, and detailed description thereof is not repeated.

Figure 13:
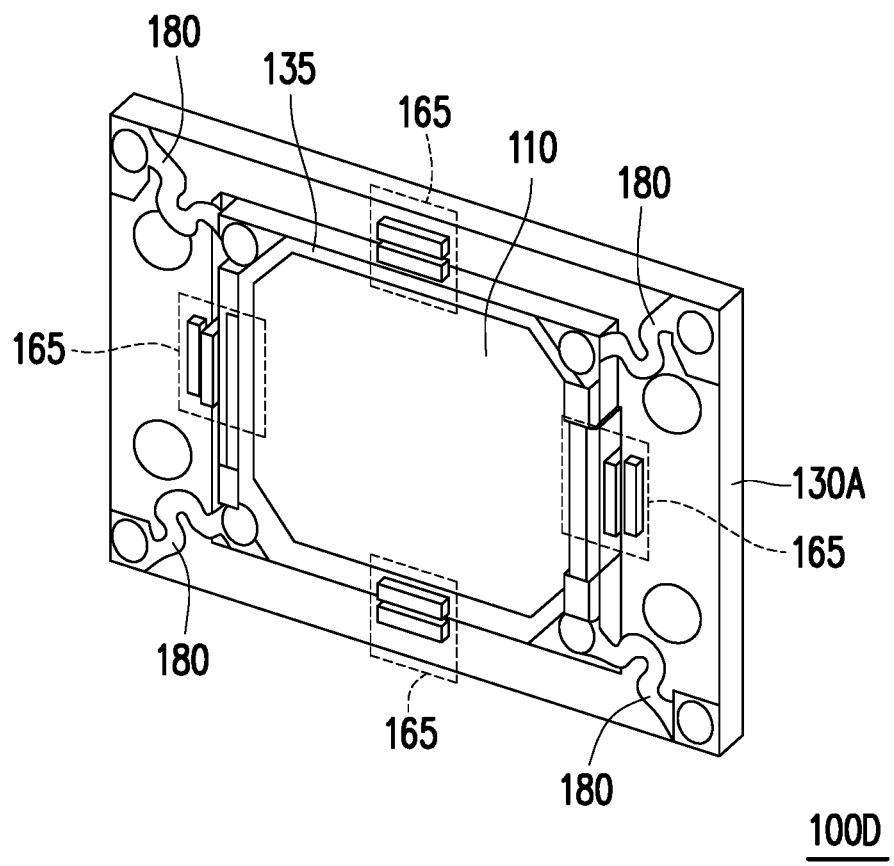
FIG. 13 is a three-dimensional view of an image resolution enhancement device according to another embodiment of the invention.

FIG. 13 is a three-dimensional view of an image resolution enhancement device according to another embodiment of the invention. Referring to FIG. 13, the image resolution enhancement device 100D of the embodiment is similar to the image resolution enhancement device 100 of FIG. 2, and a main difference therebetween is that in the embodiment, only one frame 135 is configured, and the frame 135 is connected to four corners of the carrier board 130A through a flexible structure 180 with a flexible shape, and four vibration elements 165 are disposed on four sides of the frame 135. Namely, in the embodiment, the first frame and the second frame are integrated into one frame 135, and the axes (i.e. the first axis and the second axis) of the frame 135 may be implemented by the flexible structure 180. Therefore, when the image resolution enhancement device 100D is driven, under the function of the vibration elements 165, the frame 135 carrying the transparent plate 110 is rotated to move the image light L2 to a plurality of positions within one frame cycle, so as to achieve the effect of improving the resolution.

Due to the design of the flexible shape of the flexible structure 180, the power consumption required for rotating the frame 135 by the vibration elements 165 is relatively low.

Figure 14:
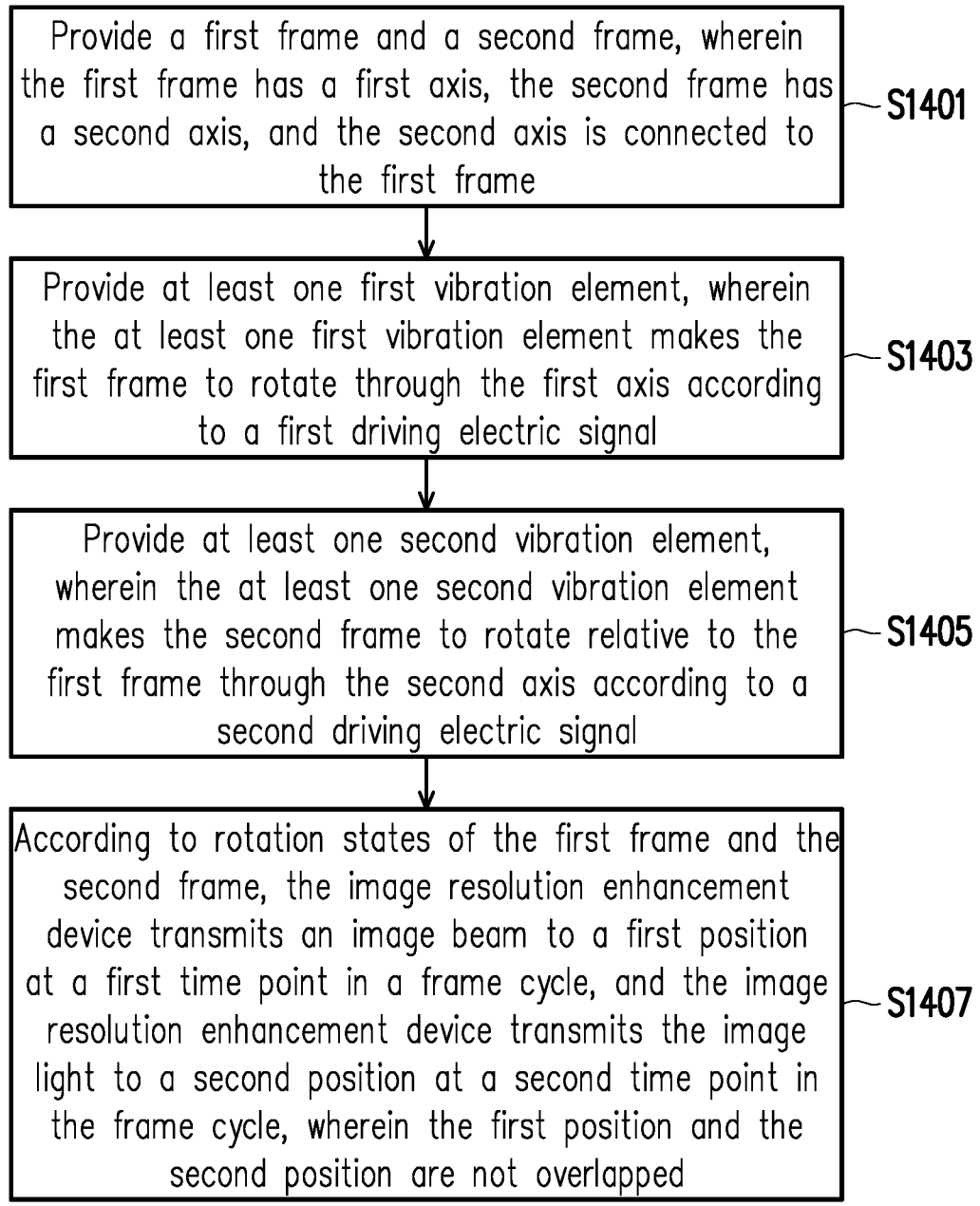
FIG. 14 is a flowchart illustrating a driving method of an image resolution enhancement device according to an embodiment of the invention.
Figure 15A:
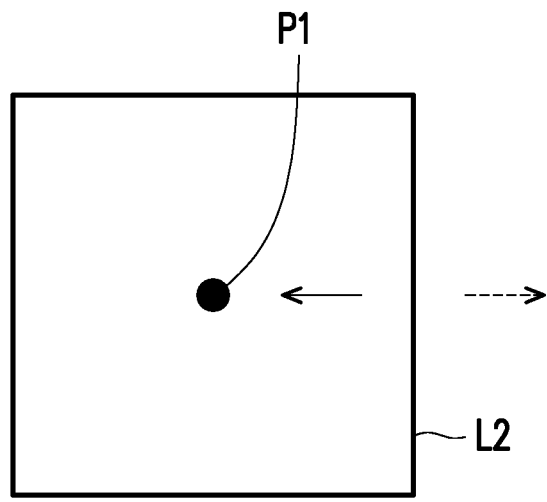
FIG. 15A to FIG. 15B are schematic diagrams of a moving path of an image light when the image resolution enhancement device is driven according to another embodiment of the invention.
Figure 15B:
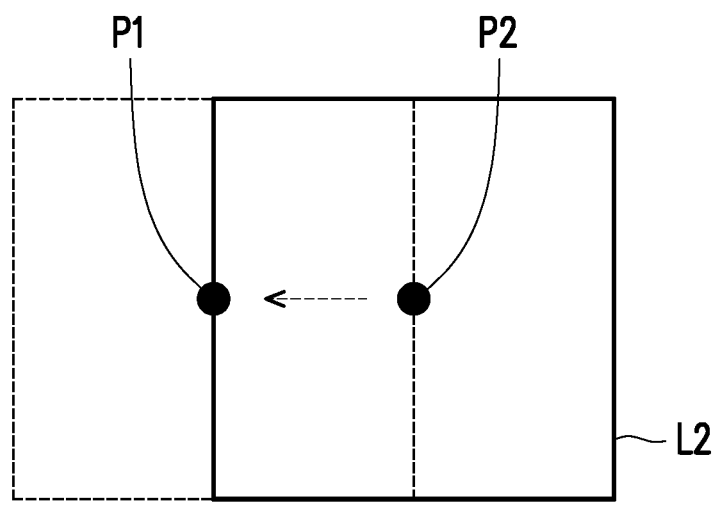
Figure 16A:
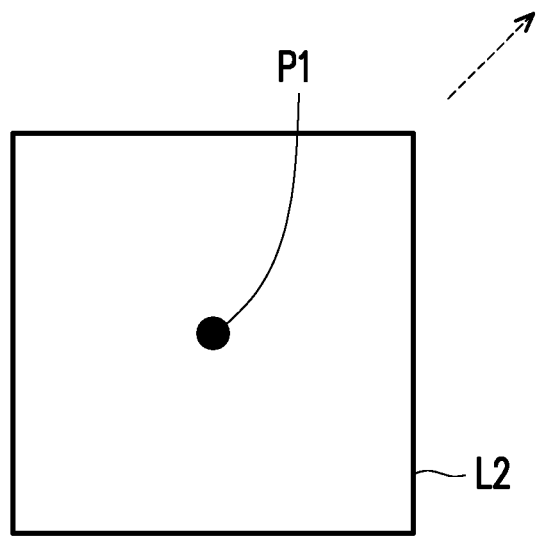
FIG. 16A to FIG. 16C are schematic diagrams of moving paths of an image light when the image resolution enhancement device is driven according to two other embodiments of the invention.
Figure 16B:
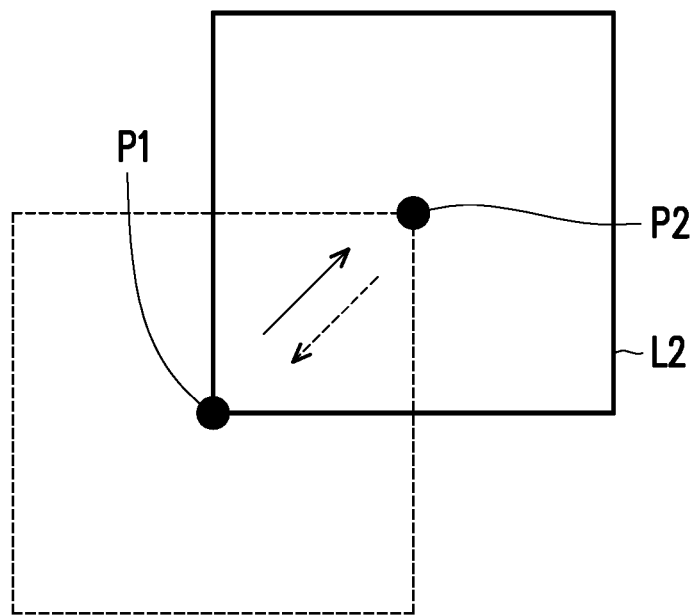
Figure 16C:
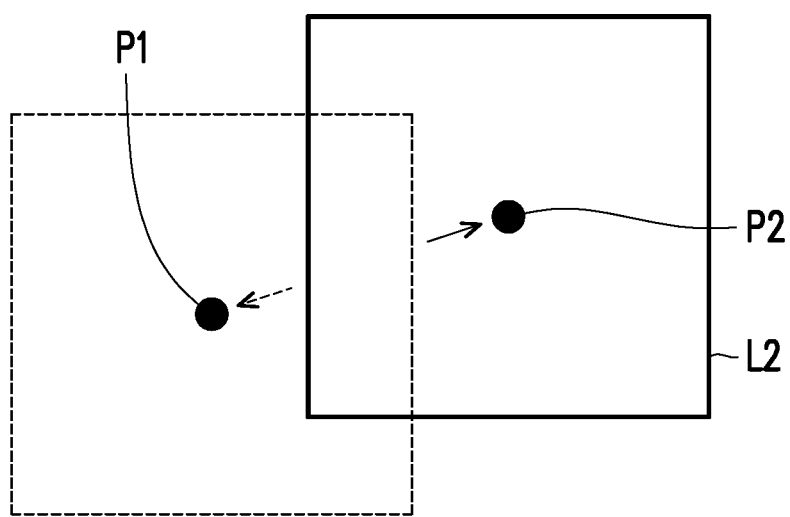

The image resolution enhancement devices 100, 100B, 100C, 100D of the aforementioned embodiments may have an effect of enhancing the resolution by four times, though other embodiments may be downward compatible with/applied to projectors adapted to enhance the resolution by two times, and thus has application convenience as that shown below. FIG. 14 is a flowchart illustrating a driving method of an image resolution enhancement device according to an embodiment of the invention. FIG. 15A to FIG. 15B are schematic diagrams of a moving path of the image light when the image resolution enhancement device is driven according to another embodiment of the invention. Referring to FIG. 14, FIG. 15A and FIG. 15B, first, in step S1401, a first frame and a second frame are provided, where the first frame has a first axis, the second frame has a second axis, and the second axis is connected to the first frame. In step S1403, at least one first vibration element is provided, and the at least one first vibration element makes the first frame to rotate through the first axis according to a first driving electric signal. In step S1405, at least one second vibration element is provided, and the at least one second vibration element makes the second frame to rotate relative to the first frame through the second axis according to a second driving electric signal. In step S1407, according to rotation states of the first frame and the second frame, the image resolution enhancement device transmits the image beam L2 to a first position P1 at a first time point in a frame cycle, and the image resolution enhancement device transmits the image light L2 to a second position P2 at a second time point in the frame cycle, wherein the first position P1 and the second position P2 are not overlapped. In an embodiment, as shown in FIG. 15A, at the first time point in the first frame cycle, the image resolution enhancement device, for example, transmits the image light L2 located at the initial position (not shown) to the first position P1 located to the left. Then, the image light L2 located at the first position P1 is, for example, expected to be transmitted to the right. In an embodiment, as shown in FIG. 15B, at the second time point in the first frame cycle, the image resolution enhancement device, for example, transmits the image light L2 located at the first position P1 to the second position P2 rightwards. Then, the image light L2 located at the second position P2 is, for example, expected to be transmitted back to the first position P1 leftwards. In an embodiment, at the first time point in a second frame cycle, the image resolution enhancement device, for example, transmits the image light L2 located at the second position P2 back to the first position P1, where the next frame cycle of the first frame cycle is the second frame cycle. In the embodiment of FIG. 15A to FIG. 15B, the first position P1 and the second position P2 are, for example, two positions on a horizontal line, though the invention is not limited thereto. In other embodiments, the first position and the second position may be two positions on a vertical line, for example, the position A and the position B in FIG. 5B, though the invention is not limited thereto. In other embodiments, as shown in FIG. 16A and FIG. 16B, to move from the first position P1 in a direction of 45 degrees may reach the second position P2, and to move from the second position P2 in the direction of 45 degrees may reach the first position P1, though the invention is not limited thereto. In other embodiments, as shown in FIG. 16A and FIG. 16C, to move from the first position P1 in a direction of an arbitrary angle may reach the second position P2, and to move from the second position P2 in the direction of the arbitrary angle may reach the first position P1, though the invention is still not limited thereto.

In summary, the embodiments of the invention have at least one of following advantages or effects. In the embodiments of the invention, the first vibration element and the second vibration element in the image resolution enhancement device may respectively drive the first frame and the second frame of the image resolution enhancement device according to the first driving electric signal and the second driving electric signal, such that the first frame may rotate relative to the carrier board through the first axis, and the second frame may rotate relative to the first frame through the second axis, and the image beam may be refracted to two positions or four positions due to rotation of the transparent plate fixed to the second frame. Therefore, in one frame cycle, the image with two times or four times of the resolution is synthesized by swiftly moving the positions of the image light, so as to greatly enhance the resolution of the projection light.

Moreover, through a phase collaboration of the first driving electric signal and the second driving electric signal, an enhancement multiples of the resolution may be selected according to an actual requirement, so that the users may have more selectivity and better use convenience.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements or distinguish different embodiments or ranges and should not be regarded as limiting the upper or lower bound of the number of the components/devices.

What is claimed is:

1. A projector, comprising:
   an illumination device, adapted to provide an illumination light;
   an optical engine module, disposed on a transmission path of the illumination light, and comprising:
      a light valve, adapted to convert the illumination light into an image light; and
      an image resolution enhancement device, disposed on a transmission path of the image light, and comprising:
         a transparent plate, adapted to be pervious to the image light and refract the image light; and
         a carrier, adapted to carry the transparent plate, and the carrier comprising:
            a carrier board;
            a first frame, having a first axis, wherein the first axis is connected to the carrier board;
            a second frame, having a second axis, wherein the second axis is connected to the first frame, the transparent plate is fixed in the second frame;
            at least one first vibration element, disposed on at least one side of the first frame and outside the first frame, the at least one first vibration element making the first frame to rotate relative to the carrier board through the first axis according to a first driving electric signal; and
            at least one second vibration element, disposed on at least one side of the second frame and between the first frame and the second frame, the at least one second vibration element making the second frame to rotate relative to the first frame through the second axis according to a second driving electric signal, wherein according to rotation states of the first frame and the second frame, the image light is transmitted to a first position at a first time point in a frame cycle, and the image light is transmitted to a second position at a second time point in the frame cycle, wherein the first position and the second position are different; and
   a projection lens, disposed on the transmission path of the image light from the image resolution enhancement device, wherein the image light becomes a projection light after passing through the projection lens.

2. The projector as claimed in claim 1, wherein the first axis is orthogonal to the second axis.

3. The projector as claimed in claim 1, wherein the first axis is non-orthogonal to and non-parallel with the second axis.

4. The projector as claimed in claim 1, wherein the at least one first vibration element comprises:
   a first coil, disposed on one of the first frame and the carrier board; and
   a first magnet, disposed on the other one of the first frame and the carrier board, and the first coil facing the first magnet.

5. The projector as claimed in claim 4, wherein the at least one first vibration element further comprises a first yoke, wherein the first magnet is located between the first coil and the first yoke.

6. The projector as claimed in claim 1, wherein the at least one second vibration element comprises:
   a second coil, disposed on one of the second frame and the first frame; and
   a second magnet, disposed on the other one of the second frame and the first frame, and the second coil facing the second magnet.

7. The projector as claimed in claim 6, wherein the at least one second vibration element further comprises a second yoke, wherein the second magnet is located between the second coil and the second yoke.

8. An optical engine module, comprising:
   a light valve, configured to provide an image light;
   an image resolution enhancement device, disposed on a transmission path of the image light, and comprising:
      a transparent plate, adapted to be pervious to the image light and refract the image light; and
      a carrier, adapted to carry the transparent plate, and comprising:
         a carrier board;
         a first frame, having a first axis, wherein the first axis is connected to the carrier board;
         a second frame, having a second axis, wherein the second axis is connected to the first frame, the transparent plate is fixed in the second frame;
         at least one first vibration element, disposed on at least one side of the first frame and outside the first frame, the at least one first vibration element making the first frame to rotate relative to the carrier board through the first axis according to a first driving electric signal; and at least one second vibration element, disposed on at least one side of the second frame and between the first frame and the second frame, the at least one second vibration element making the second frame to rotate relative to the first frame through the second axis according to a second driving electric signal, wherein according to rotation states of the first frame and the second frame, the image light is transmitted to a first position at a first time point in a frame cycle, and the image light is transmitted to a second position at a second time point in the frame cycle, wherein the first position and the second position are different.

9. The optical engine module as claimed in claim 8, wherein the first axis is orthogonal to the second axis.

10. The optical engine module as claimed in claim 8, wherein the first axis is non-orthogonal to and non-parallel with the second axis.

11. The optical engine module as claimed in claim 8, wherein the at least one first vibration element comprises:
   a first coil, disposed on one of the first frame and the carrier board; and
   a first magnet, disposed on the other one of the first frame and the carrier board, and the first coil facing the first magnet.

12. The optical engine module as claimed in claim 11, wherein the at least one first vibration element further comprises a first yoke, wherein the first magnet is located between the first coil and the first yoke.

13. The optical engine module as claimed in claim 8, wherein the at least one second vibration element comprises:
   a second coil, disposed on one of the second frame and the first frame; and
   a second magnet, disposed on the other one of the second frame and the first frame, and the second coil facing the second magnet.

14. The optical engine module as claimed in claim 13, wherein the at least one second vibration element further comprises a second yoke, wherein the second magnet is located between the second coil and the second yoke.

15. An image resolution enhancement device, comprising:
   a transparent plate, adapted to be pervious to an image light and refract the image light; and
   a carrier, the transparent plate being fixed on the carrier, and the carrier comprising:
      a carrier board;
      a first frame, having a first axis, wherein the first axis is connected to the carrier board;
      a second frame, having a second axis, wherein the second axis is connected to the first frame, wherein the transparent plate is fixed in the second frame;
      at least one first vibration element, disposed on at least one side of the first frame and outside the first frame, the at least one first vibration element making the first frame to rotate relative to the carrier board through the first axis according to a first driving electric signal; and
      at least one second vibration element, disposed on at least one side of the second frame and between the first frame and the second frame, the at least one second vibration element making the second frame to rotate relative to the first frame through the second axis according to a second driving electric signal, wherein according to rotation states of the first frame and the second frame, the image light is transmitted to a first position at a first time point in a frame cycle, and the image light is transmitted to a second position at a second time point in the frame cycle, wherein the first position and the second position are different.

16. The image resolution enhancement device as claimed in claim 15, wherein the first axis is orthogonal to the second axis.

17. The image resolution enhancement device as claimed in claim 15, wherein the first axis is non-orthogonal to and non-parallel with the second axis.

18. The image resolution enhancement device as claimed in claim 15, wherein the at least one first vibration element comprises:
   a first coil, disposed on one of the first frame and the carrier board; and
   a first magnet, disposed on the other one of the first frame and the carrier board, and the first coil facing the first magnet.

19. The image resolution enhancement device as claimed in claim 18, wherein the at least one first vibration element further comprises a first yoke, wherein the first magnet is located between the first coil and the first yoke.

20. The image resolution enhancement device as claimed in claim 15, wherein the at least one second vibration element comprises:
   a second coil, disposed on one of the second frame and the first frame; and
   a second magnet, disposed on the other one of the second frame and the first frame, and the second coil facing the second magnet.

21. The image resolution enhancement device as claimed in claim 20, wherein the at least one second vibration element further comprises a second yoke, wherein the second magnet is located between the second coil and the second yoke.

22. A driving method of an image resolution enhancement device, comprising:
   providing a first frame and a second frame, wherein the first frame has a first axis, the second frame has a second axis, and the second axis is connected to the first frame;
   providing at least one first vibration element, wherein the at least one first vibration element is disposed on at least one side of the first frame and outside the first frame, and the at least one first vibration element makes the first frame to rotate through the first axis according to a first driving electric signal;
   providing at least one second vibration element, wherein the at least one second vibration element is disposed on at least one side of the second frame and between the first frame and the second frame, and the at least one second vibration element makes the second frame to rotate relative to the first frame through the second axis according to a second driving electric signal; and
   according to rotation states of the first frame and the second frame, the image resolution enhancement device transmitting an image beam to a first position at a first time point in a frame cycle, and the image resolution enhancement device transmitting the image light to a second position at a second time point in the frame cycle, wherein the first position and the second position are different.

* * * * *